(12) United States Patent
Onishi (10) Patent No.: US 8,818,210 B2
(45) Date of Patent: Aug. 26, 2014

(54) APPARATUSES AND METHODS FOR IDENTIFYING AND REGISTERING A PRINTER ON A NETWORK

(75) Inventor: Akiko Onishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 12/942,448

(22) Filed: Nov. 9, 2010

(65) Prior Publication Data

US 2011/0116129 A1   May 19, 2011

(30) Foreign Application Priority Data

Nov. 16, 2009   (JP) ................................ 2009-260975

(51) Int. Cl.
*G06F 3/12* (2006.01)

(52) U.S. Cl.
USPC ............... 399/10; 358/1.9; 358/1.15; 399/11; 710/8; 710/10; 710/15; 710/19

(58) Field of Classification Search
USPC ............. 358/1.9, 1.15; 399/11, 10; 710/8, 10, 710/15, 19
See application file for complete search history.

(56) References Cited

U.S. PATENT DOCUMENTS

| | | | |
|---|---|---|---|
| 6,301,012 B1 * | 10/2001 | White et al. | 358/1.15 |
| 7,447,757 B2 * | 11/2008 | Muto | 709/223 |
| 2004/0205260 A1 * | 10/2004 | Oki et al. | 710/8 |
| 2005/0141014 A1 * | 6/2005 | Kikuchi et al. | 358/1.14 |

FOREIGN PATENT DOCUMENTS

| | | |
|---|---|---|
| JP | 2001-92761 A | 4/2001 |
| JP | 2004-110393 A | 4/2004 |

OTHER PUBLICATIONS

Japanese Office Action issued in corresponding application No. 2009-260975 issued on Nov. 26, 2013.

* cited by examiner

*Primary Examiner* — Peter K Huntsinger
(74) *Attorney, Agent, or Firm* — Carter, DeLuca, Farrell & Schmidt, LLP

(57) ABSTRACT

An information processing apparatus for registering a printing apparatus connected by a network including a printing apparatus detection unit configured to detect the printing apparatus connected by the network, an operation instruction unit configured to instruct a user of the information processing apparatus to execute an initial setting relevant operation on a printing apparatus to be registered, a status information acquisition unit configured to acquire status information indicating a status of the detected printing apparatus, a printing apparatus identification unit configured to detect a printing apparatus in which the initial setting relevant operation is executed based on the status indicated by the acquired status information and identify the detected printing apparatus in which the initial setting relevant operation is executed as the printing apparatus to be registered, and a printing apparatus registration unit configured to register the identified printing apparatus.

5 Claims, 7 Drawing Sheets

| HEAD CORRECTION |
|---|
| STARTING PRINT HEAD CORRECTION.<br>SELECT "HEAD CORRECTION" FROM MENU ON PANEL OF PRINTER AND OPERATE ACCORDING TO DISPLAYED INSTRUCTIONS.<br>CLICK "OK" BUTTON IF YOU ARE READY TO START OPERATION OF PRINTER.<br><br>OK |

FIG.6B

| PRINTER SELECTION |
|---|
| SELECT PRINTER TO BE USED |

| NAME OF MODEL | EXECUTION DATA AND TIME OF HEAD POSITION ADJUSTMENT |
|---|---|
| Photo Type A | AT 12:05 ON AUGUST 24, 2009 |
| Photo Type A | AT 17:23 ON DECEMBER 10, 2008 |
|  |  |

OK    CANCEL

FIG.7

APPARATUSES AND METHODS FOR IDENTIFYING AND REGISTERING A PRINTER ON A NETWORK

BACKGROUND OF THE INVENTION

1. Field of the Invention

The present invention relates to an information processing apparatus, a method for controlling the information processing apparatus, and a storage medium storing a computer program.

2. Description of the Related Art

A printing system has been proposed in which a host apparatus such as a plurality of personal computers is connected with an output apparatus such as a printer on a local area network (LAN) in an office. In such a printing system, when the host apparatus instructs the output apparatus to perform printing, generally, installation and initial setting of the output apparatus are completed, and then the host apparatus registers the output apparatus to be used and selects the registered apparatus in printing. The initial setting in installing the output apparatus includes setting of a printer to be connected to a network, filling of toner or ink, and color calibration.

If the output apparatus is an inkjet printer, correction processing of a head, for example, is the initial setting. More specifically, the head correction processing refers to the following processing. For example, the inkjet printer discharges a minute ink droplet from a printer head to form an image, however, an ink discharge position may be slightly shifted due to variation of the printer head in a production stage. The correction processing for performing control to compensate such a slight shift in the ink discharge position is the head correction processing.

When the host apparatus registers a printer as the output apparatus, the host apparatus generally performs the installation of a printer driver and printer registration processing for associating a printer to be used therewith using a setup program. The printer driver is software for using a printer to be registered.

When the host apparatus detects a plurality of printers on the network in the registration processing of a printer, a user of the host apparatus has to identify and select any of printers that the user wants to use in a list. The following method is discussed as a method for identifying a printer to be registered when a plurality of printers is detected on a network. More specifically, a setup program displays a list of address information pieces such as media access control (MAC) address/ internet protocol (IP) address of the detected printers and a user selects address information about the printer to be registered from the displayed information pieces to identify the printer to be registered.

Japanese Patent Application Laid-Open No. 2001-92761 discusses the following network system for identifying a printer to be operated. In the network system, a user presses in advance a mark button provided on the printer to be operated. When the computer detects a printer on the network, the computer acquires information about a state of pressing of the mark button, a mark identification (ID), and a user name and indicates the information to the user. The user identifies the printer to be operated based on the information indicated to the user.

However, there is a problem in the method for identifying the printer to be registered by the user selecting the address information of the printer to be registered from the address information pieces indicated by the setup program. That is, the user needs to confirm the address information to select the address information of the printer to be registered.

More specifically, time-consuming work is required, for a display apparatus such as a liquid crystal panel of the printer main body displaying the address information and the user confirming or printing the displayed address information. Further, a method for selecting the printer to be registered based on a list of numeric values and/or alphabetic characters like the MAC address/IP address of the printer is prone to a human error. Furthermore, the user needs executing a specific operation not only for pressing the mark button, but also for setting the mark ID or the user name in the technique discussed in Japanese Patent Application Laid-Open No. 2001-92761. Accordingly, it is not able to identify and register the printer to be registered by a simple operation by the technique discussed in Japanese Patent Application Laid-Open No. 2001-92761.

In recent years, an inkjet printer which is low-priced and connectable to a network has been proposed and a wide range of users is used the printer on the network. For this reason, it is required to identify a printer on the network by a simpler operation in a short time period to register the printer to a system.

SUMMARY OF THE INVENTION

The present invention is directed to an information processing apparatus capable of quickly identifying and registering a printer on a network by a user performing a simple operation, a method for controlling the information processing apparatus and a storage medium storing a computer program.

According to an aspect of the present invention, an information processing apparatus for registering a printing apparatus connected by a network a printing apparatus detection unit configured to detect the printing apparatus connected by the network, an operation instruction unit configured to instruct a user of the information processing apparatus to execute an initial setting relevant operation on a printing apparatus to be registered, a status information acquisition unit configured to acquire status information indicating a status of the detected printing apparatus, a printing apparatus identification unit configured to detect a printing apparatus in which the initial setting relevant operation is executed based on the status indicated by the acquired status information and identify the detected printing apparatus in which the initial setting relevant operation is executed as the printing apparatus to be registered, and a printing apparatus registration unit configured to register the identified printing apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
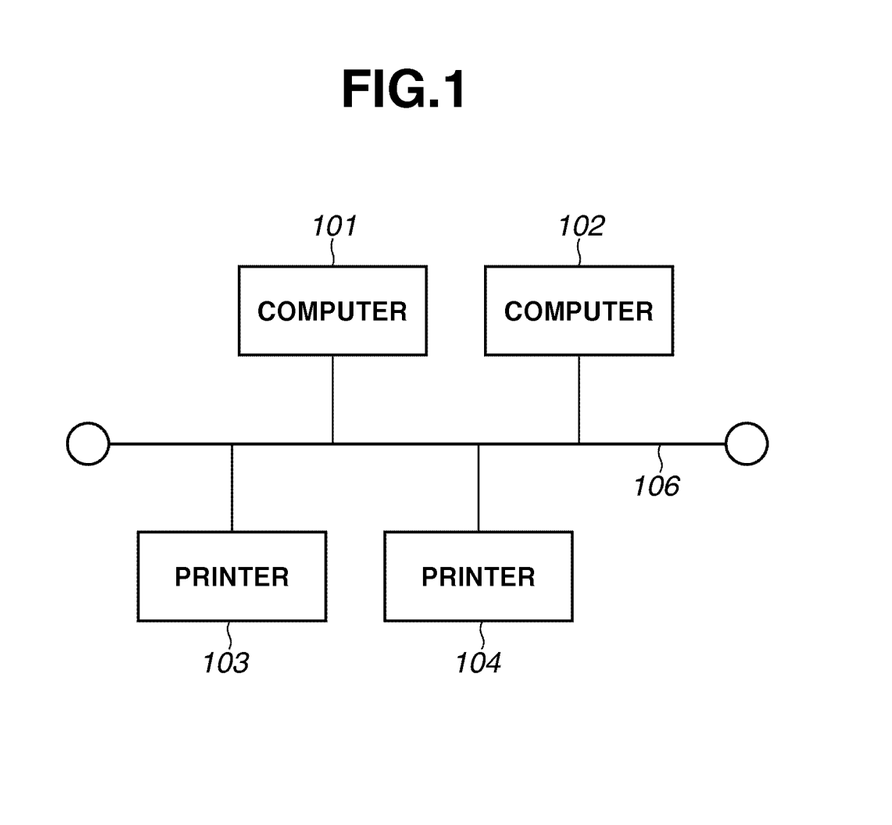
FIG. 1 is a block diagram illustrating an example of a system configuration of an exemplary embodiment of the present invention.

FIG. 1 is a block diagram illustrating an example of a system configuration of an exemplary embodiment of the present invention. The system illustrated in FIG. 1 includes a plurality of computers 101 and 102 and a plurality of printers 103 and 104. The computers 101 and 102 and the printers 103 and 104 are connected to a network 106 and communicate with one another according to transmission control protocol (TCP)/IP protocol, for example. The computer 101 is functionally similar to the computer 102. The printer 103 is functionally similar to the printer 104.

Figure 2A:
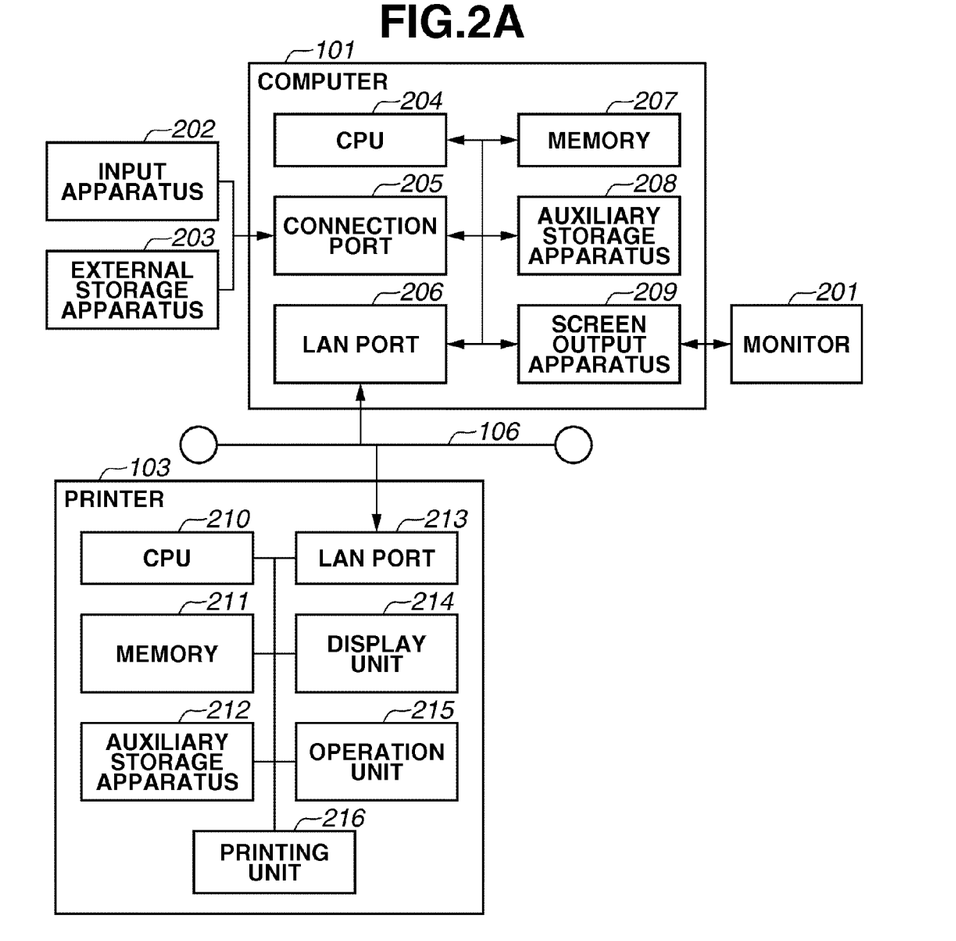
FIGS. 2A and 2B illustrate examples of the configuration of a computer and a printer and of operation execution history information respectively.
Figure 2B:
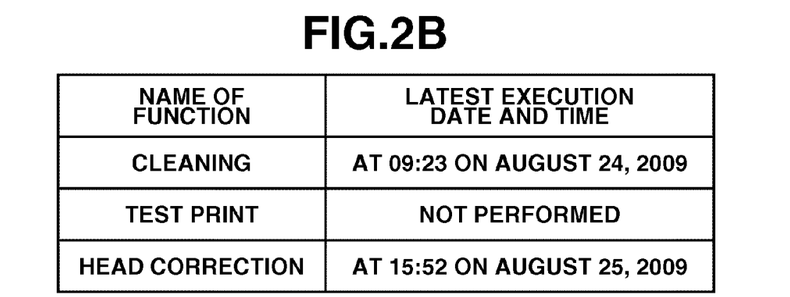

FIGS. 2A and 2B illustrate an example of the configuration of the computer and the printer and an example of operation execution history information, respectively. In FIG. 2A, the configuration of the computer 101 and the printer 103 is illustrated as an example. The computer 101 is an information processing apparatus according to the present exemplary embodiment. As a specific operation to the present exemplary embodiment, the computer 101 registers the printer 103 which is a printing apparatus connected therewith via the network 106. The computer 101 functions as a printing control apparatus which instructs the printer 103 to print print data. The computer 101 in first to third exemplary embodiments, described below, is similar in configuration to that in illustrated in FIG. 2A.

The computer 101 includes a central processing unit (CPU) 204, a connection port 205, a LAN port 206, a memory 207, an auxiliary storage apparatus 208, and a screen output apparatus 209. The CPU 204 controls the entire computer 101. As a specific operation to the present exemplary embodiment, the CPU 204 displays contents of an initial setting relevant operation to be executed on the printer to be registered on a monitor 201 via the screen output apparatus 209.

The initial setting relevant operation is the one relevant to initial setting. The initial setting relevant operation may include a head cleaning operation for removing dirt from a print head, a head correction operation for correcting a minute deviation of ink discharge accuracy in a head production process, and a test print operation, for example. The CPU 204 displays the contents of the initial setting relevant operation on the monitor 201 to instruct a user of the computer 101 to execute the initial setting relevant operation.

The CPU 204 transmits a status request to the printer 103 via the LAN port 206 and the network 106. The status request is control information for requesting the printer 103 to transmit status information indicating the status of the printer 103. The status information is information indicating the status of the printer 103. The status information includes information indicating an operation status of the printer 103 and information indicating an error status occurring in the printer 103, for example. The information indicating the operation status includes information indicating whether the printer 103 is in print processing, initial setting relevant operation execution information, and information indicating whether the printer 103 is in a standby state.

The initial setting relevant operation execution information is information indicating whether the printer 103 is executing the initial setting relevant operation. The information indicating the error status includes information indicating whether paper runs out, cover status information, and the like. The cover status information is information indicating a status of a cover. More specifically, the cover status information indicates whether the cover is opened (in an open status) or closed (in a close status). The status of the cover indicated by the cover status information included in the status information acquired from the printer is changed according to the user operating the cover of the printer.

The CPU 204 receives the status information from the printer 103 in compliance with the status request and detects a printer in which the initial setting relevant operation is executed based on the received status information. For example, if the CPU 204 instructs the user to perform the head correction operation as the initial setting relevant operation, the status information includes the information indicating whether the head correction operation is being executed as the initial setting relevant operation execution information.

Therefore, the CPU 204 detects the printer in which the head correction operation is executed, i.e., the printer in which the initial setting relevant operation is executed based on the information indicating whether the head correction operation is being executed. The CPU 204 identifies and registers the detected printer as the printer to be registered. Further, the CPU 204 transmits a print command to the printer 103 via the LAN port 206 and the network 106.

After the CPU 204 instructs the user to execute the initial setting relevant operation, if the user selects not to execute the initial setting relevant operation, the CPU 204 performs the following processing. The CPU 204 requests the printer connected therewith via the network 106 to acquire the operation execution history information. The operation execution history information is information indicating an execution history of the initial setting relevant operation performed to the printer. The operation execution history information includes contents and an execution date of the executed initial setting relevant operation, for example. The CPU 204 acquires the operation execution history information from the printer in response to an acquisition request and may identify the printer to be registered using the acquired operation execution history information.

The connection port 205 connects peripheral apparatuses such as an input apparatus 202 and an external storage apparatus 203 to the computer 101. The connection port 205 is a serial port or a universal serial bus (USB) port, for example. The LAN port 206 connects the computer 101 to the network 106. The memory 207 is a random access memory on which a work area used by the CPU 204 is developed.

The auxiliary storage apparatus 208 is a hard disk or a solid state drive (SSD), for example. The auxiliary storage apparatus 208 stores various programs such as a printer driver 302, a setup program 303, and an application 301 illustrated in FIG. 3. The screen output apparatus 209 is a video card, for example. The screen output apparatus 209 outputs various types of information on a screen. The input apparatus 202 may include a keyboard, a mouse, and scanner, for example, and inputs various types of information according to a user's operation. The external storage apparatus 203 is a USB memory, an external hard disk, a compact disc read-only memory (CD-ROM), and a digital versatile disc (DVD) ROM. The monitor 201 is connected to an output terminal of the screen output apparatus 209.

The printer 103 includes a CPU 210, a memory 211, an auxiliary storage apparatus 212, a LAN port 213, a display unit 214, an operation unit 215, and a printing unit 216.

The CPU 210 controls the entire printer 103. As a specific operation to the present exemplary embodiment, the CPU 210 receives a status request from the computer 101 via the network 106 and the LAN port 213. The CPU 210 transmits status information indicating the status of the printer 103 to the computer 101 in compliance with the received status request. The CPU 210 receives a print command from the computer 101 via the network 106 and the LAN port 213 and instructs the printing unit 216 to print print data corresponding to the print command.

The memory 211 is a random access memory on which a work area used by the CPU 210 is developed. The auxiliary storage apparatus 212 is a hard disk or an SSD. The LAN port 213 connects the printer 103 to the network 106. The display unit 214 displays a user interface (UI) corresponding to an operation performed by the user of the printer 103 via the operation unit 215 and an operation status of the printer 103. The operation unit 215 operates the main body of the printer 103 according to user's operation input.

The operation unit 215 has functions of turning on or off the power supply of the printer 103, canceling a job, changing network setting of the printer 103, referring to the network setting, and the like. Further, the operation unit 215 has a function of performing maintenance of the main body of the printer 103, i.e., a function of executing the initial setting relevant operation described above according to an instruction from the CPU 210. When the user performs operation input via the UI displayed on the display unit 214, the operation unit 215 executes the initial setting relevant operation according to the operation input. The CPU 210 stores information including the contents and the execution date of the executed initial setting relevant operation as the operation execution history information in the auxiliary storage apparatus 212. The printing unit 216 prints print data according to the instruction from the CPU 210.

FIG. 2B illustrates an example of the operation execution history information. The operation execution history information includes data items such as a name of function and the latest execution date and time. The name of function refers to the name of the initial setting relevant operation. For example, "Cleaning" set in the item of the name of function represents a head cleaning operation. "Test print" represents a test print operation. "Head correction" represents a head correction operation.

Figure 3:
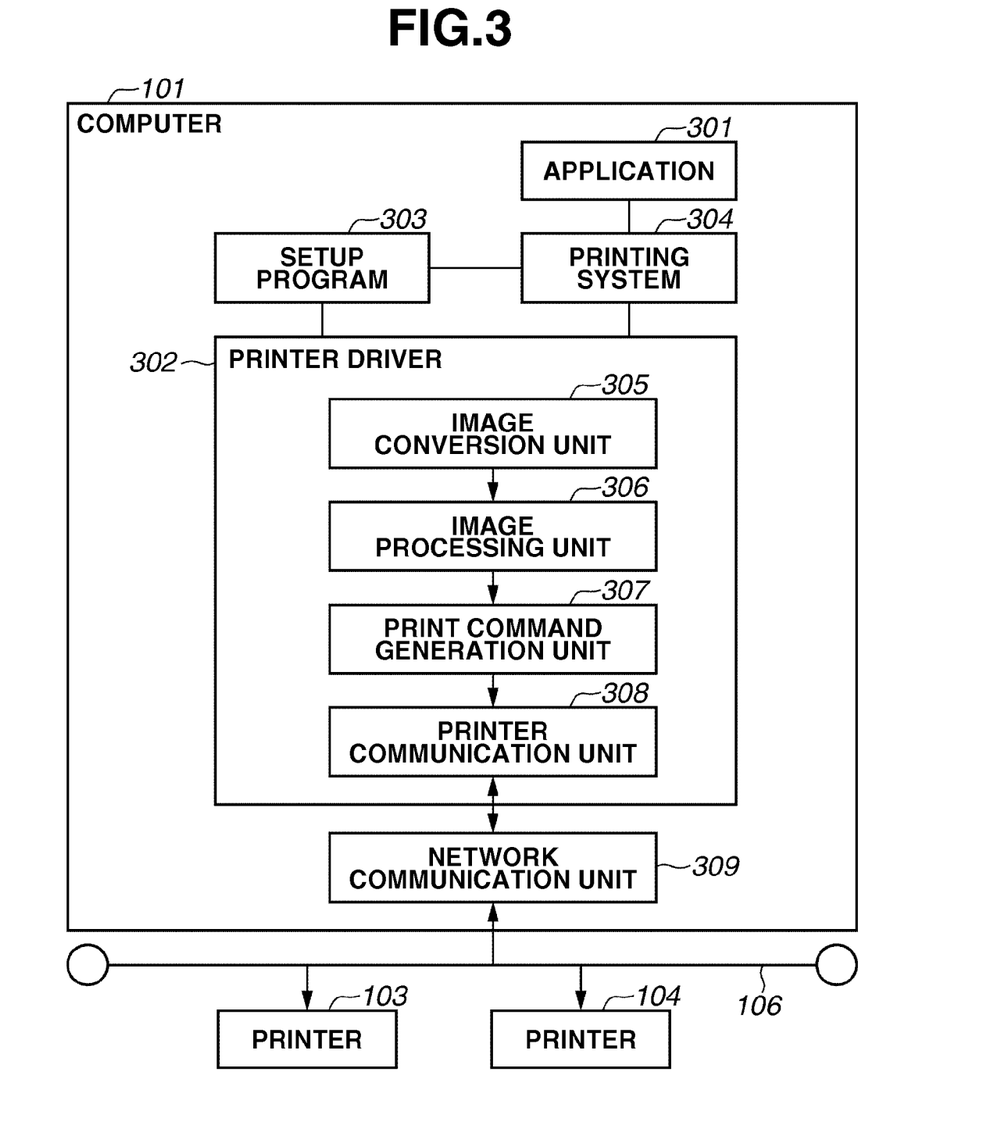
FIG. 3 is a functional block diagram of a computer.

FIG. 3 is a functional block diagram of the computer illustrated in FIGS. 1, 2A and 2B. The computer 101 includes an application 301, a printer driver 302, a setup program 303, a printing system 304, and a network communication unit 309.

The application 301 to the network communication unit 309 are stored in the auxiliary storage apparatus 208 illustrated in FIG. 2, developed on the memory 207 and executed by the CPU 204. The application 301 displays the user interface (UI) for print setting on the screen and executes the print setting according to user's operation input using the UI.

The printer driver 302 converts the print data into a format corresponding to the print setting set by the application 301 and generates a print command corresponding to the print data. The printer driver 302 transmits the print command to the printer via the network communication unit 309 and the network 106. As a specific operation to the present exemplary embodiment, the printer driver 302 transmits a status request to the printers on the network 106 detected by the setup program 303.

The printer driver 302 receives status information from the printers in compliance with the status request and delivers the status information to the setup program 303. If the user selects not to execute the initial setting relevant operation, the printer driver 302 transmits an acquisition request to the printers detected by the setup program 303 for the operation execution history information. Further, the printer driver 302 receives the operation execution history information from the printers in compliance with the acquisition request for the operation execution history information and delivers the operation execution history information to the setup program 303.

As illustrated in FIG. 3, the printer driver 302 includes an image conversion unit 305, an image processing unit 306, a print command generation unit 307, and a printer communication unit 308.

The image conversion unit 305 converts red-green-blue (RGB) components which is an image data format in print data to cyan-magenta-yellow-black (CMYK) components suited for print. The image processing unit 306 performs image processing such as error diffusion according to the print setting to the print data converted by the image conversion unit 305. The print command generation unit 307 generates the print command corresponding to the print data.

The printer communication unit 308 transmits the print command to the printers via the network communication unit 309 and the network 106. The printer communication unit 308 performs the following processing according to an instruction from the setup program 303. More specifically, the printer communication unit 308 transmits a request for acquiring the statues and the operation execution history information to a network communication printer. The printer communication unit 308 receives the status information and the operation execution history information from the printer in compliance with the request for acquiring the statues and the operation execution history information and delivers the received status information and operation execution history information to the setup program 303.

The setup program 303 installs the printer driver 302 and registers the printer according to the instruction from the CPU 204. More specifically, the setup program 303 functions as a print apparatus detection unit for detecting the printers (the printers 103 and 104 in FIG. 3) connected with the network 106.

The setup program 303 also functions as a status information acquisition unit for acquiring status information indicating the status of the detected printer. More specifically, the setup program 303 instructs the printer communication unit 308 of the printer driver 302 to transmit the status request to the detected printer. The setup program 303 receives the status information from the printer communication unit 308 which receives the status information from the printer to which the status request is transmitted.

Further, the setup program 303 functions as an operation instruction unit for instructing the user to execute the initial setting relevant operation on the printer to be registered. More specifically, the setup program 303 displays the contents of the initial setting relevant operation to be executed on the printer to be registered on the monitor 201 according to the instruction from the CPU 204.

The setup program 303 functions as a print apparatus identification unit. More specifically, the setup program 303 detects the printer in which the initial setting relevant operation is executed based on the acquired status information and identifies the detected printer in which the initial setting relevant operation is executed as the printer to be registered.

More specifically, the setup program 303 refers to the initial setting relevant operation execution information included in the status information. If the initial setting relevant operation execution information indicates that the printer 103 is executing the initial setting relevant operation, the setup program 303 identifies the printer 103 as the printer to be registered. It is allowable for the setup program 303 to receive the operation execution history information from the printer driver 302 and identify the printer to be registered using the received operation execution history information.

The printing system 304 manages a printer list. The printer list is a list for the printers used for printing. When the user actually executes printing, the application 301 displays the printers registered in the printer list on the UI. Accordingly, the user can select the printer which the user wants to use printing from the registered printers.

The printing system 304 functions as a print apparatus registration unit for registering the printer identified as the printer to be registered by the setup program 303 in the print list. The printing system 304 is a part of an operating system (OS) used by the computer 101. For example, if the OS is Linux (registered trademark), the printing system 304 is a Common Unix Printing System (CUPS) (registered trademark). The network communication unit 309 communicates with the printers 103 and 104 via the network 106. A method for controlling the information processing apparatus and a computer program thereof according to the present exemplary embodiment are realized by functions of units configuring the computer 101 illustrated in FIG. 3.

Figure 4A:
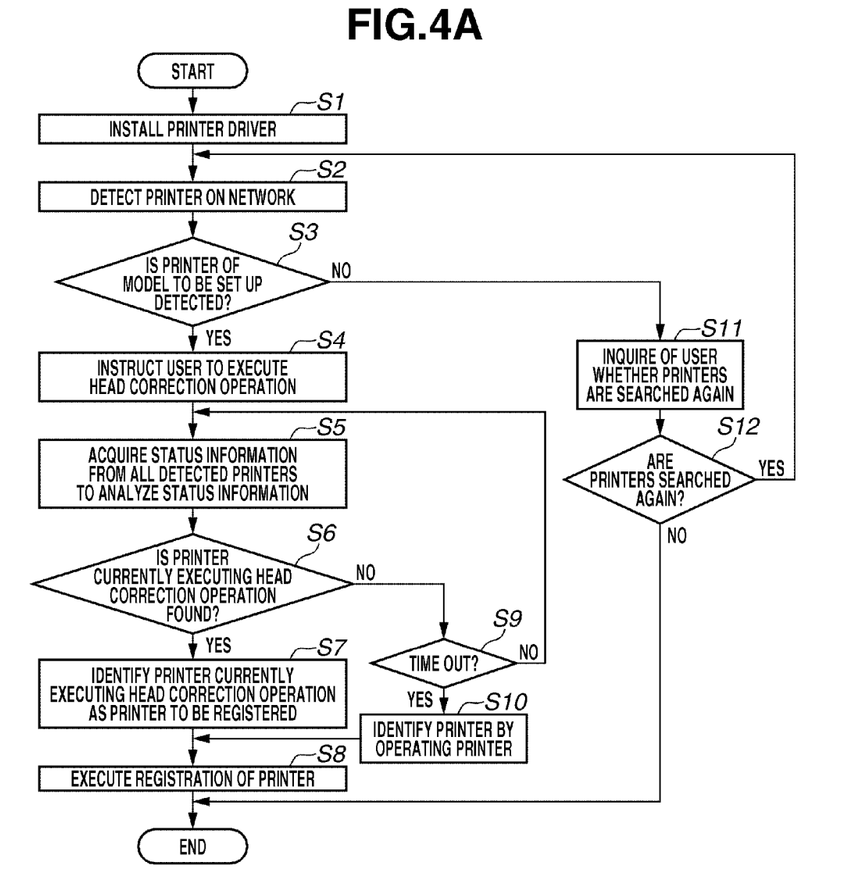
FIGS. 4A and 4B illustrate an operation of a computer according to a first exemplary embodiment of the present invention.
Figure 4B:
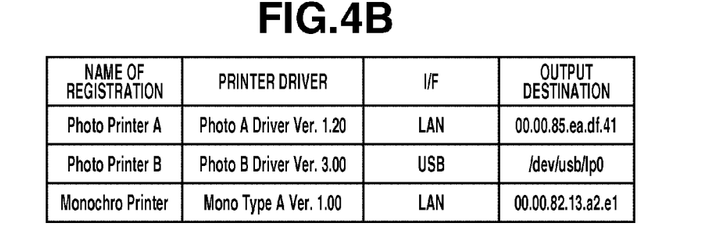

FIGS. 4A and 4B illustrate the operation of the computer according to a first exemplary embodiment of the present invention. FIG. 4A illustrates an operation process flow of the computer according to the first exemplary embodiment. Steps S1 to S12 illustrated in FIG. 4A are realized by the CPU 204 executing the setup program 303 and the printing system 304.

A process where the computer 101 performs the setup of a printer corresponding to a predetermined model is described below as an example. In this example, a model corresponding to the printer 103 is described as a target model to be set up. First, the setup program 303 is started in response to the user's operation input. In step S1, the setup program 303 copies or installs the program including the printer driver 302 in a predetermined storage unit in the computer 101. In step S1, the setup program 303 requests the OS to install the printer driver 302.

In step S2, the setup program 303 searches for printers connected on the network 106 and detects the printer on the network 106. In step S2, the setup program 303 acquires corresponding information about the name of the model representing the type of the printer, and the MAC address and the IP address of the printer.

In step S3, the setup program 303 determines whether the printer of the target model to be set up is detected. If the setup program 303 determines that the printer of the target model to be set up is not detected (NO in step S3), in step S11, the setup program 303 displays that the printer is not detected and inquires of the user whether printers are searched again.

In step S12, the setup program 303 determines whether to search again for printers according to the user's selection input. If the setup program 303 determines to search again for printers (YES in step S12), the processing returns to step S2. If the setup program 303 determines not to search again for printers (NO in step S12), the process is ended.

If the setup program 303 determines that the printer of the target model to be set up is detected (YES in step S3), then in step S4, the setup program 303 instructs the user to execute the head correction operation, i.e., the initial setting relevant operation.

The setup program 303 displays a message that "Perform the head correction operation of the printer which you want to register. When you are ready, click the OK button to perform the head correction operation," for example, on the display screen along with an OK button. When the user clicks the OK button, information indicating that the user accepts the execution of the head correction operation is input to the setup program 303.

The setup program 303 displays the above message using a graphical user interface (GUI). The setup program 303 may display the message using a text-based user interface (UI) with the use of terminal software.

In step S5, clicking of the OK button by the user causes the setup program 303 to acquire the status information from all the printers detected in step S2 to analyze the status information. In the example, the status information includes the initial setting relevant operation execution information and the cover status information.

In step S6, the setup program 303 determines whether the printer which is executing the head correction operation is found based on the result of analysis of the status information. In step S6, the setup program 303 determines whether the printer which is executing the head correction operation is found based on information indicating whether the head correction operation is being executed included in the status information.

If the setup program 303 determines that the printer which is executing the head correction operation is found (YES in step S6), in step S7, the setup program 303 identifies the printer which is executing the head correction operation as the printer to be registered. In step S8, the printing system 304 registers the printer identified in step S7.

If the setup program 303 determines that the printer which is executing the head correction operation is not found (NO in step S6), in step S9, the setup program 303 determines whether a predetermined time-out period has passed. If the setup program 303 determines that the predetermined time-out period has not passed (NO in step S9), the processing returns to step S5.

If the setup program 303 determines that the predetermined time-out period has passed (YES in step S9), in step S10, a printer identification process is conducted by operating the printer.

The printer identification process conducted by operating the printer is described below. The setup program 303 instructs the user to execute the operation of the printer. The operation of the printer is a predetermined operation different from the initial setting relevant operation. The status of the printer is changed by executing the operation. The operation of the printer is to open the cover of the printer, for example. When the user opens the cover of the printer, the status of the cover of the printer is changed from a close state to an open state. The operation of the printer which the user is instructed to execute is not limited to the operation for opening the cover of the printer, and an arbitrary operation which changes the status of the printer can be used.

The setup program 303 reacquires the status information from the printer detected in step S2. The setup program 303 determines whether the status of the cover indicated by the cover status information included in the reacquired status information is changed from the status of the cover indicated by the cover status information included in the status information acquired in step S5.

More specifically, the setup program 303 determines whether the status of the cover is changed from the close state to the open status. If the setup program 303 determines that the status of the cover is changed from the close state to the open status, the setup program 303 identifies the printer of which the status of the cover is changed as the printer to be registered. The proceeding proceeds to step S8.

If the setup program 303 does not detect the printer in which the initial setting relevant operation is executed, the setup program 303 detects the printer in which the operation of the printer is executed based on the status of the printer changed according to the execution of the operation of the printer included in the status information. The setup program 303 identifies the printer in which the operation of the printer is executed as the printer to be registered.

The registration of the printer in step S8 is described. The setup program 303 transmits corresponding information about the registration name corresponding to the printer identified in step S8, the name of the printer driver used for printing, and the MAC address of the printer to the printing system 304 as the registration printer information. The setup program 303 instructs the printing system 304 to register the registration printer information. The printing system 304 registers information including the registration printer information in the printer list according to the instruction from the setup program 303.

FIG. 4B illustrates an example of the registration printer information to be registered in the printer list. "Name of registration" in the printer list refers to a registration name of a printer. "Printer driver" refers to a name of a printer driver used for printing. "I/F" refers to an interface between the printer and the computer. "Output destination" refers to the MAC address or the USB port number of the printer.

In the example of FIG. 4B, three printers with the registration names of "Photo Printer A," "Photo Printer B," and "Monochro Printer" are registered. "Photo Printer A," for example, uses a printer driver of "Photo A Driver Ver.1.20," LAN is used as the interface, and the MAC address of the output destination is "00.00.85.ea.df.41." "Photo Printer B" uses USB as the interface and therefore the USB port number is registered as the output destination.

The registration printer information is not limited to that illustrated in FIG. 4B. Any information which can identify a printer may be used as the registration printer information according to the OS of the computer 101 and the type of the printing system 304.

A process is described below in which the computer 101 registers the printer to be registered (the printer 103, for example) and then causes the printer 103 to execute printing. The application 301 displays a menu from which the user can select a printer used for printing. The application 301 inquires of the printing system a list of names of the printers registered in the printer list to acquire the list. The application 301 displays a list of the acquired registration names of the printers on the menu.

When the user selects the desired registration name of the printer from the list of the registration names of the printers, the application 301 displays the UI for the print setting. The print setting includes settings of a type of paper such as plain paper/photo paper, a size of paper such as A4/Letter, two-sided printing, and layout, for example.

The application 301 determines the print setting which is an object to be set as follows. The application 301 acquires items that can be set by the printer driver 302 corresponding to the name of the registered printer selected by the user and a list of values that can be set to respective items from the printer driver 302 via the printing system 304. The application 301 determines the print setting which is the object to be set based on the acquired items and values that can be set.

The user presses a print execution button after performing the print setting on the UI to start a printing process. The flow of the printing process is described below. The application 301 converts print data to a predetermined format (for example, a portable document format (PDF) or PostScript (registered trade mark)) which is independent of an output appliance and outputs the converted print data. The application 301 inputs the output print data to the printing system 304 and requests the printing system 304 to print it. At this point, the application 301 notifies the printing system 304 of the name of the registered printer selected by the user to request the printing system 304 to execute printing by the printer corresponding to the name of the registered printer.

The printing system 304 receives the request from the application 301 and searches for the printer driver corresponding to the name of the registered printer. The printing system 304 converts the print data into a format which the printer driver acquired by the search can receive, outputs the converted print data, and delivers the output print data to the printer driver 302. The printing system 304 notifies the printer driver 302 of information about various print settings performed on the above described UI for print setting.

The printer driver 302 converts the data delivered by the printing system 304 to a print command corresponding to the print setting using the image conversion unit 305, the image processing unit 306, and the print command generation unit 307. The printer driver 302 outputs the print command to the printing system 304.

The printing system 304 transmits the print command output by the printer driver 302 to the MAC address of the output destination corresponding to the name of the registered printer selected by the user, i.e., the printer 103. The printer 103 forms the print data corresponding to the print command on paper and the printing process is ended.

The computer 101 according to the first exemplary embodiment instructs the user to execute the initial setting relevant operation, detects the printer which is executing the initial setting relevant operation based on the initial setting relevant operation execution information included in the status information of the printer, and regards the detected printer as the printer to be registered. Thus, according to the computer 101 of the first exemplary embodiment, the user can identify the printer to be registered by executing a simple operation (a head correction operation, for example).

Further, the computer 101 of the first exemplary embodiment regards the printer which is executing the initial setting relevant operation as the printer to be registered, so that the printer to be registered can be identified in parallel with execution of the initial setting, i.e., setup thereof. As a result, the computer 101 can identify the printer to be registered in a short time period after the computer 101 has started the setup of the printer.

According to the computer 101 of the first exemplary embodiment, the user does not need to confirm the MAC address and the IP address of the printer in order to identify the printer to be registered. Thus, a human error, for example, a user wrongly selects a printer in registration of the printer, can be prevented.

Figure 5:
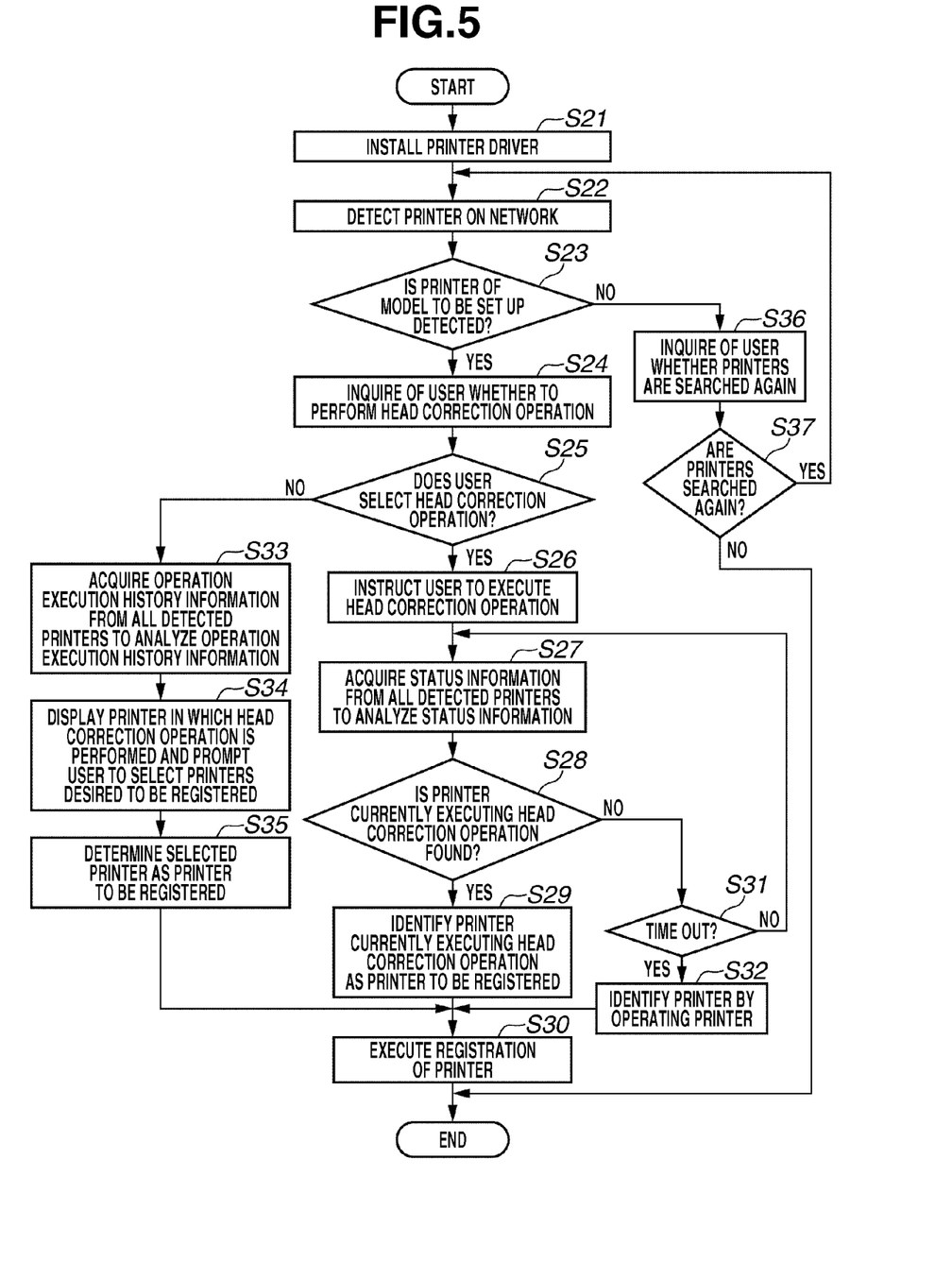
FIG. 5 illustrates an operation process flow of a computer apparatus according to a second exemplary embodiment of the present invention.

FIG. 5 illustrates an operation process flow of a computer apparatus according to a second exemplary embodiment of the present invention. The computer 101 according to the second exemplary embodiment inquires of a user whether to perform a head correction operation of a printer that the user wants to register, and if the user selects not to perform the head correction operation, the computer 101 identifies a printer to be registered using operation execution history information.

The computer 101 displays a message for inquiring of the user whether to perform the head correction operation, because if the head correction operation is already executed on the printer that the user wants to register, there is no need for executing the head correction operation on the printer.

Steps S21, S22, S23, S36, and S37 illustrated in FIG. 5 are similar to steps S1, S2, S3, S11, and S12 in FIG. 4A respectively. Further, steps S27 to S32 in FIG. 5 are similar to steps S5 to S10 in FIG. 4A respectively.

In the second exemplary embodiment, in step S24 in FIG. 5, the setup program 303 inquires of the user whether to perform the head correction operation of the printer that the user wants to register. The setup program 303 makes the inquiry to the user by displaying a message, for example. If the user received the inquiry executes the head correction operation, the user notifies the setup program 303 of execution of the head correction operation by performing a predetermined operation input.

Figure 6A:
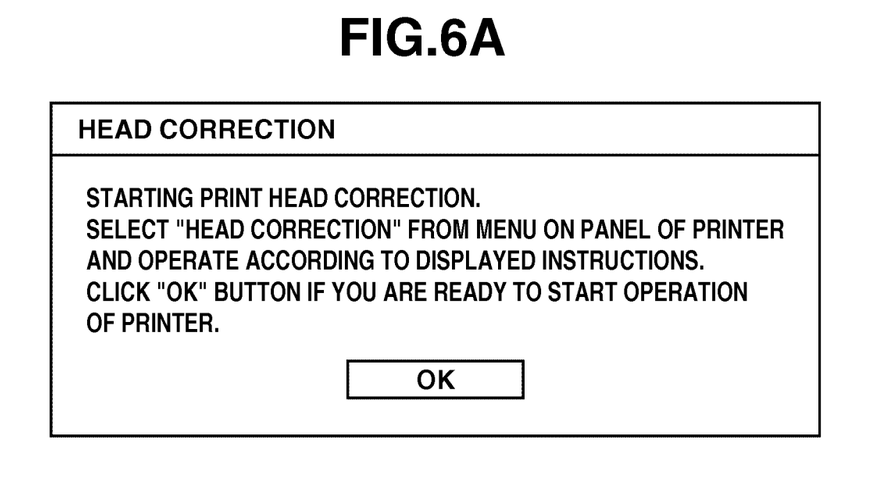
FIGS. 6A and 6B illustrate a message for instructing execution of a head correction operation and an example of display of a screen for selecting a printer, respectively.

In step S25, the setup program 303 determines whether the user selects to perform the head correction operation based on the user's operation input. If the setup program 303 determines that the user selects to perform the head correction operation (YES in step S25), then in step S26, the setup program 303 displays on a screen a message for instructing the user to execute the head correction operation as illustrated in FIG. 6A. The setup program 303 waits for the user to click an OK button on the displayed screen illustrated in FIG. 6A. Then the processing proceeds to step S27.

If the setup program 303 determines that the user selects not to perform the head correction operation (NO in step S25), in step S33, the setup program 303 acquires the operation execution history information from all the printers detected in step S22 to analyze the information.

Figure 6B:
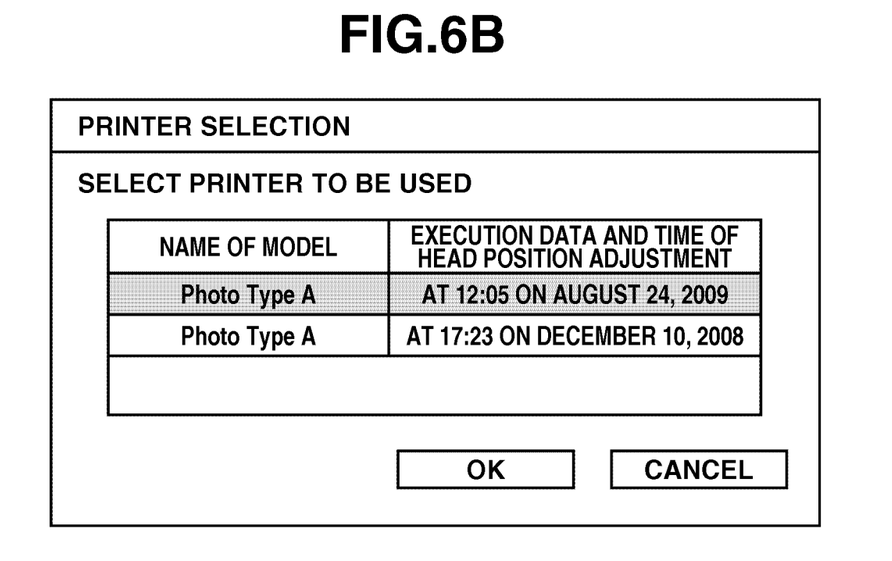

In step S34, the setup program 303 displays the printer in which the head correction operation is executed in a predetermined period based on the result of analysis of the operation execution history information and prompts the user to select the printer that the user wants to register. In step S34, the setup program 303 displays a selection screen, for example, as illustrated in FIG. 6B. The printer displayed on the selection screen illustrated in FIG. 6B is the one in which the head correction operation has been already executed.

In step S35, when the user selects the printer on the selection screen and clicks an OK button, the setup program 303 identifies the selected printer as the printer to be registered. The processing proceeds to step S30.

If the user selects not to execute the initial setting relevant operation (NO in step S25 in FIG. 5), the setup program 303 performs the following processing. The setup program 303 acquires an execution history of the initial setting relevant operation from the detected printers and identifies the printer to be registered using the acquired execution history of the initial setting relevant operation.

According to the computer 101 of the second exemplary embodiment, the user can select whether to execute the head correction operation according to the inquiry from the computer 101. Consequently, the user can select not to perform the head correction operation according to an execution status of the past head correction operation.

According to the computer 101 of the second exemplary embodiment, if the user selects not to execute the head correction operation, the printer in which the head correction operation has been already executed can be displayed on the screen based on the operation execution history information. Accordingly, the user can easily select the printer to be registered.

Figure 7:
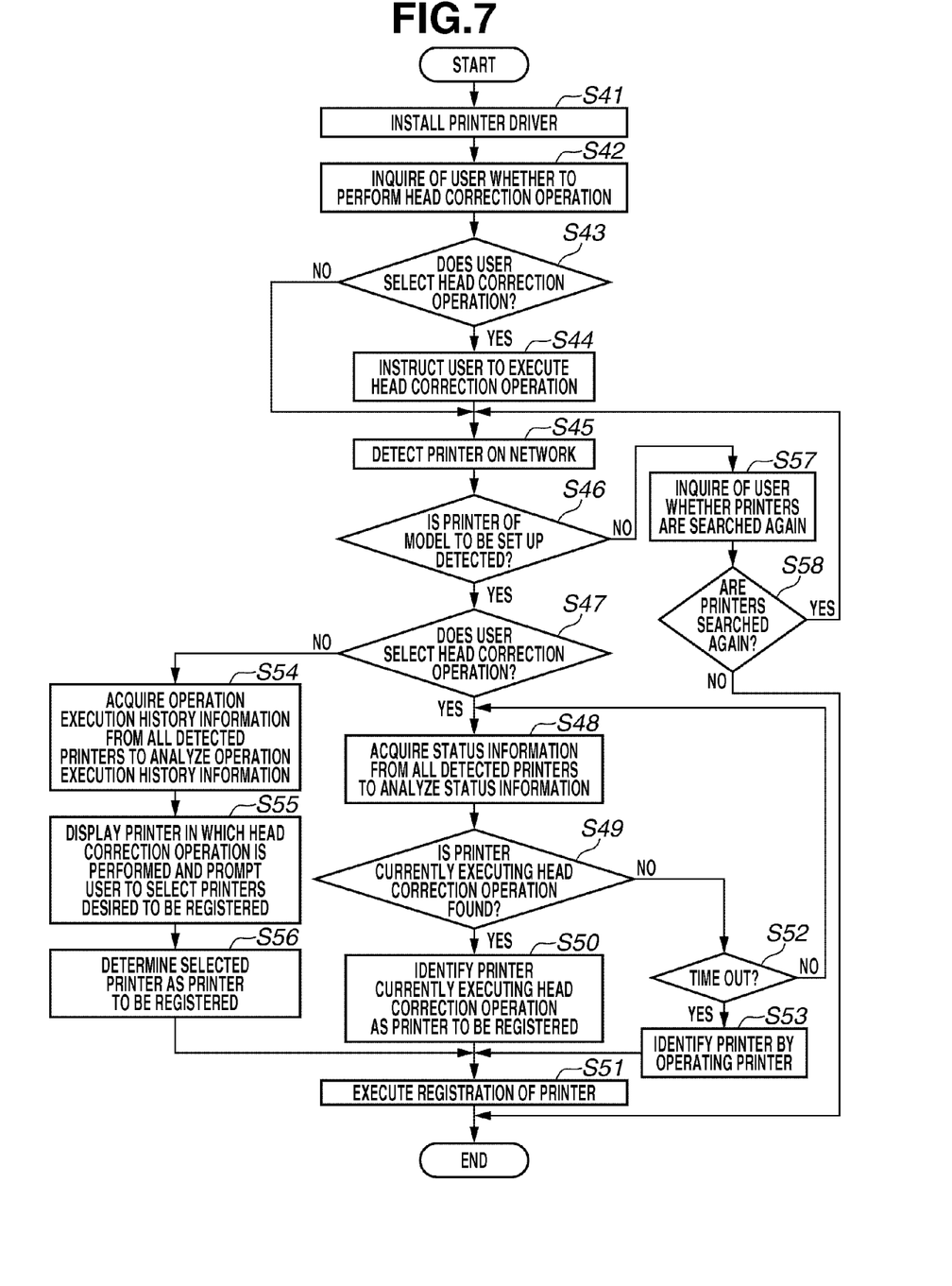
FIG. 7 illustrates an operation process flow of a computer apparatus according to a third exemplary embodiment of the present invention.

FIG. 7 illustrates an operation process flow of a computer apparatus according to a third exemplary embodiment. Step S41 in FIG. 7 is similar to step S21 in FIG. 5. Steps S42 to S44 in FIG. 7 are similar to steps S24 to S26 in FIG. 5 respectively. Steps S45, S46, S57, and S58 in FIG. 7 are similar to steps S22, S23, S36, and S37 in FIG. 5 respectively. Steps S48 to S53 in FIG. 7 are similar to steps S27 to S32 in FIG. 5 respectively. Steps S54 to S56 in FIG. 7 are similar to steps S33 to S35 in FIG. 5 respectively.

In the first exemplary embodiment described with reference to FIGS. 4A and 4B, the setup program 303 detects a printer on the network (step S2 in FIG. 4A), and then, the setup program 303 instructs the user to execute the initial setting relevant operation (step S4 in FIG. 4A). On the other hand, the setup program 303 of the computer 101 according to the third exemplary embodiment instructs the user to execute the head correction operation in steps S42 to S44, and then, in step S45, the setup program 303 searches for and detects printers on the network 106.

In step S47, the setup program 303 determines whether the user who receives the inquiry in step S43 selects to perform the head correction operation. If the setup program 303 determines that the user selects not to perform the head correction operation, in steps S54 to S56, the setup program 303 identifies the printer to be registered using the operation execution history information.

In the third exemplary embodiment, the computer 101 does not always need to inquire of the user whether to perform the head correction operation by omitting the processing in steps S43, S47, and S54 to S56, as is the case with the first exemplary embodiment.

According to the third exemplary embodiment, the user can be instructed to execute the head correction operation before the execution of the printer detection processing on the network. Accordingly, the printer detection processing is executed in parallel with the head correction operation, and time consumed in identifying the printer to be registered can be reduced.

The present invention can also be realized by executing the following computer-executable process. More specifically, software (a program) for realizing the functions of the above exemplary embodiments is supplied to a system or an apparatus via a network or various computer-readable storage media and a computer (or CPU or micro processing unit (MPU)) of the system or the apparatus reads and executes the program. In this case, the program and the storage media storing the program constitutes the present invention.

According to the exemplary embodiments of the present invention, the user can identify and register a printer on a network in a short time period by performing the initial setting relevant operation.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-260975 filed Nov. 16, 2009, which is hereby incorporated by reference herein in its entirety.

What is claimed is:

1. An information processing apparatus for registering a printing apparatus connected to a network, the information processing apparatus comprising:

a printing apparatus detection unit configured to detect the printing apparatus connected to the network;

an operation instruction unit configured to instruct a user of the information processing apparatus to execute an initial setting relevant operation on the printing apparatus to be registered;

a status information acquisition unit configured to acquire status information indicating a status of the detected printing apparatus, wherein the status information indicates that the detected printing apparatus is executing the initial setting relevant operation;

a printing apparatus identification unit configured to detect a printing apparatus in which the initial setting relevant operation is executed based on the status indicated by the acquired status information and identify the detected printing apparatus in which the initial setting relevant operation is executed as the printing apparatus to be registered; and a printing apparatus registration unit configured to register the identified printing apparatus, wherein the printing apparatus identification unit acquires, if the execution of the initial setting relevant operation is not selected, an execution history of the initial setting relevant operation from the printing apparatus detected by the printing apparatus detection unit, and identifies the printing apparatus to be registered using the acquired execution history of the initial setting relevant operation.

2. The information processing apparatus according to claim 1, wherein the operation instruction unit instructs execution of the initial setting relevant operation after the printing apparatus detection unit detects the printing apparatus.

3. The information processing apparatus according to claim 1, wherein the operation instruction unit instructs the user to execute a predetermined operation different from the initial setting relevant operation, and the printing apparatus identification unit detects, if the printing apparatus in which the initial setting relevant operation is executed is not detected, the printing apparatus in which the predetermined operation is executed based on the status of the printing apparatus which changes with the execution of the predetermined operation and is included in the status information, and identifies the detected printing apparatus in which the predetermined operation is executed as the printing apparatus to be registered.

4. A method for controlling an information processing apparatus for registering a printing apparatus connected to a network, the method comprising:

detecting the printing apparatus connected to the network;

instructing a user of the information processing apparatus to execute an initial setting relevant operation relating to an initial setting of a printing apparatus to be registered;

acquiring status information indicating a status of the detected printing apparatus, wherein the status information indicates that the detected printing apparatus is executing the initial setting relevant operation;

detecting a printing apparatus in which the initial setting relevant operation is executed based on the status indicated by the acquired status information and identifying the detected printing apparatus in which the initial setting relevant operation is executed as the printing apparatus to be registered; and registering the identified printing apparatus, wherein acquiring status information includes acquiring, if the execution of the initial setting relevant operation is not selected, an execution history of the initial setting relevant operation from the detected printing apparatus, and identifying the printing apparatus to be registered using the acquired execution history of the initial setting relevant operation.

5. A non-transitory computer-readable storage medium storing a computer-executable process, the computer-executable process causing a computer to perform a method comprising:

detecting a printing apparatus connected to a network;

instructing a user of an information processing apparatus to execute an initial setting relevant operation relating to an initial setting of a printing apparatus to be registered;

acquiring status information indicating a status of the detected printing apparatus, wherein the status information indicates that the detected printing apparatus is executing the initial setting relevant operation;

detecting a printing apparatus in which the initial setting relevant operation is executed based on the status indicated by the acquired status information and identifying the detected printing apparatus in which the initial setting relevant operation is executed as the printing apparatus to be registered; and registering the identified printing apparatus, wherein acquiring status information includes acquiring, if the execution of the initial setting relevant operation is not selected, an execution history of the initial setting relevant operation from the detected printing apparatus, and identifying the printing apparatus to be registered using the acquired execution history of the initial setting relevant operation.

* * * * *